United States Patent
Fukushima

(10) Patent No.: US 11,017,956 B2
(45) Date of Patent: May 25, 2021

(54) CAPACITOR AND METHOD FOR MANUFACTURING SAME

(71) Applicant: NIPPON CHEMI-CON CORPORATION, Tokyo (JP)

(72) Inventor: Kouta Fukushima, Tokyo (JP)

(73) Assignee: NIPPON CHEMI-CON CORPORATION, Tokyo (JP)

(*) Notice: Subject to any disclaimer, the term of this patent is extended or adjusted under 35 U.S.C. 154(b) by 0 days.

(21) Appl. No.: 16/478,303

(22) PCT Filed: Jan. 24, 2018

(86) PCT No.: PCT/JP2018/002095
§ 371 (c)(1),
(2) Date: Jul. 16, 2019

(87) PCT Pub. No.: WO2018/139478
PCT Pub. Date: Aug. 2, 2018

(65) Prior Publication Data
US 2019/0371531 A1    Dec. 5, 2019

(30) Foreign Application Priority Data
Jan. 25, 2017  (JP) .............. JP2017-010954

(51) Int. Cl.
  *H01G 9/055* (2006.01)
  *H01G 9/00* (2006.01)
  *H01G 9/008* (2006.01)

(52) U.S. Cl.
  CPC .......... *H01G 9/055* (2013.01); *H01G 9/008* (2013.01); *H01G 9/0029* (2013.01)

(58) Field of Classification Search
  CPC .......... H01G 9/04; H01G 9/045; H01G 9/048; H01G 9/055; H01G 9/012
  See application file for complete search history.

(56) References Cited

U.S. PATENT DOCUMENTS

2012/0214049 A1    8/2012    Iwamoto et al.

FOREIGN PATENT DOCUMENTS

| CN | 102217014 A | 10/2011 |
|----|-------------|---------|
| CN | 102683029 A | 9/2012  |

(Continued)

OTHER PUBLICATIONS

International Search Report dated Apr. 17, 2018, issued in counterpart International Application No. PCT/JP2018/002095, with English Translation. (3 pages).

(Continued)

*Primary Examiner* — Eric W Thomas
(74) *Attorney, Agent, or Firm* — Westerman, Hattori, Daniels & Adrian, LLP

(57) ABSTRACT

A capacitor has electrode foil (2, 60) and a terminal (tab 4) connected, an etch layer (16) being formed in the electrode foil, wherein a plurality of interrupting parts (12) are included in the etch layer, which is formed in the electrode foil, and at least in a connection part (stitching part 6) at which the terminal is connected. It makes it possible for the electrode foil of a higher capacitance to have flexibility, makes it possible to suppress cracks caused by pressing, and makes it possible to prevent cracks from spreading. In addition, such effects are expected that the electrode foil can be prevented from being damaged in a process of connecting the tab including folding the electrode foil, and pressing raised pieces of the electrode foil and the tab onto the electrode foil.

13 Claims, 6 Drawing Sheets

(56) References Cited

FOREIGN PATENT DOCUMENTS

| JP | 44-6110 B | | 3/1969 | |
|---|---|---|---|---|
| JP | 7-106203 A | | 4/1995 | |
| JP | 2003282364 A | * | 10/2003 | |
| JP | 2013-153024 A | | 8/2013 | |
| WO | WO-2010116668 A1 | * | 10/2010 | ............. H01G 9/008 |

OTHER PUBLICATIONS

Written Opinion of the International Searching Authority (Form PCT/ISA/237) dated Apr. 17, 2018, issued in counterpart International Application No. PCT/JP2018/002095 (3 pages).
Extended (Supplementary) European Search Report dated Oct. 7, 2020, issued in counterpart EP Application No. 18743950.0. (8 pages).
Office Action dated Nov. 17, 2020, issued in counterpart CN Application No. 201880007215.2, with English Translation. (15 pages).
Notification of transmittal of Translation of the International Preliminary Report on Patentability (Form PCT/IB/326) issued in counterpart International Application No. PCT/JP2018/002095 dated Aug. 8, 2019 with Forms PCT/IB/373 and PCT/IB/338. (4 pages).
Written Opinion dated Apr. 17, 2018, issued in counterpart Application No. PCT/JP2018/002095, with English translation. (6 pages).
Office Action dated Dec. 15, 2020, issued in counterpart JP Application No. 2017-010954, with English translation (6 pages).

* cited by examiner

CAPACITOR AND METHOD FOR MANUFACTURING SAME

TECHNICAL FIELD

The present invention relates to terminal techniques for electrode foil used for an electrolytic capacitor and the like.

BACKGROUND ART

A terminal that is a separate component is connected to electrode foil in a capacitor such as an electrolytic capacitor. Techniques for connecting a terminal to electrode foil include, for example, stitching and cold welding. In stitching, a flat board part of a terminal is layered on electrode foil to be passed through by a stitching needle from this flat board part side, raised pieces on the terminal side which are formed by cutting caused by this passage of the stitch needle are passed through the electrode foil, and these raised pieces are molded on and pressed onto the electrode foil, to connect the electrode foil and the terminal.

Such a technique is, unlike the other connection techniques, an excellent connection technique because the technique uses the minimum number of components that are a terminal and electrode foil only and uses, in a connection process, moldability and retaining properties that material of the terminal has.

Concerning this stitching, it is disclosed that electrode foil and a boardlike terminal are layered on each other to be unitedly sandwiched, a through hole is formed in each of them, raised pieces of the terminal which are passed through the electrode foil are molded on the electrode foil (for example, Patent Literature 1). It is also known that a tab is layered on electrode foil to be arranged on a lower die, a stitch needle is passed through the tab and the electrode foil from the top of the tab toward the electrode foil, and a knock-up pin is pressed onto raised pieces passing through the electrode foil from the tab, toward an upper die, to connect the tab and the electrode foil (for example, Patent Literature 2).

CITATION LIST

Patent Literature 1: JP S44-006110 B
Patent Literature 2: JP H7-106203 A

SUMMARY OF INVENTION

Technical Problem

Valve metal foil of aluminum, copper or the like is used for electrode foil used for an electrolytic capacitor. An etch layer is formed over the surface of this valve metal foil by a surface-enlarging process, and a dielectric oxide film is formed thereover by chemical conversion treatment. For example, in electrode foil using aluminum, aluminum itself has excellent extensibility and flexibility but a dielectric oxide film is hard, which leads to lower extensibility and flexibility of the electrode foil. Particularly in recent years, a surface-enlarging process with a higher enlargement has been treated to enlarge a surface area of electrode foil in order to meet demands for a higher capacitance, reduced size and weight, etc. of electrolytic capacitors. Following this, an area of a dielectric oxide film has been enlarged, so that further fragility and hardening of the electrode foil occur to make flexibility that material itself has extremely low.

In such stitching of layering a terminal on electrode foil to be passed through by a stitch needle, and in cold welding of pressure-welding electrode foil and a terminal, stress acts on electrode foil when a stitch needle passes through or when a terminal is pressure-welded, and this stress may cause cracks and fractures. Damages such as cracks and fractures can be fixed by an aging process including another chemical conversion treatment. On the assumption of fractures etc. however, a fixing process includes a troublesome aging process requiring some time, which is problematic.

Patent Literatures 1 and 2 are silent about such a problem, and the structures thereof cannot solve such a problem.

In view of the problem, an object of the present invention is to prevent cracks and fractures in a process of connecting a tab to electrode foil on which a surface-enlarging process with a higher enlargement and chemical conversion treatment are treated, to have capacitor of higher reliability.

Solution to Problem

To achieve the object, according to one aspect of a capacitor of the present invention, in the capacitor having electrode foil and a terminal connected, an etch layer being formed in the electrode foil, a plurality of interrupting parts are included in the etch layer, which is formed in the electrode foil, and at least in a connection part at which the terminal is connected.

In the capacitor, the electrode foil may include a plurality of the interrupting parts except for a foil core portion thereof.

In the capacitor, the electrode foil may include the interrupting parts on an end part of the electrode foil in a vicinity of the connection part at which the terminal is connected.

In the capacitor, the electrode foil may include the interrupting parts in either one or both of faces in the connection part, one of the faces abutting on the terminal of which a part passes through the electrode foil, the other of the faces not abutting on the terminal.

In the capacitor, each of the interrupting parts may have a shape of a straight line of a predetermined length, a curved line of a predetermined length, or a crossing lines, or any combination thereof.

In the capacitor, the electrode foil may include the interrupting parts in either one or both faces thereof.

In the capacitor, the electrode foil may include the interrupting parts in both faces thereof either at positions where the interrupting parts face each other across the foil core portion, or at positions where the interrupting parts do not face each other across the foil core portion.

To achieve the object, according to one aspect of a method for manufacturing a capacitor of the present invention, the method for manufacturing a capacitor having electrode foil and a terminal connected includes: forming a plurality of interrupting parts at least in a connection part at which the terminal is connected on an etch layer, the etch layer being formed in the electrode foil; and arranging the terminal at the connection part, to connect the terminal.

Advantageous Effects of Invention

According to the present invention, any of the following effects can be obtained.

(1) Interrupting parts formed in a surface of electrode foil makes it possible for the electrode foil of a higher capacitance to have flexibility, makes it possible to suppress cracks caused by pressing, and makes it possible to prevent cracks from spreading.

(2) Forming interrupting parts leads to improved moldability of electrode foil, which makes it possible to prevent the electrode foil from being damaged in a process of connecting a tab including folding the electrode foil, and pressing raised pieces of the electrode foil and the tab onto the electrode foil.

(3) Improved moldability of electrode foil makes it possible to further thin a core portion of electrode foil, and to have a capacitor of a higher capacitance.

(4) Suppressing breakages in electrode foil makes it possible to improve reliability of the electrode foil and the capacitor.

Other objects, features and advantages of the present invention will be clearer with reference to the attached drawings and the embodiments.

DESCRIPTION OF EMBODIMENTS

First Embodiment

Figure 1:
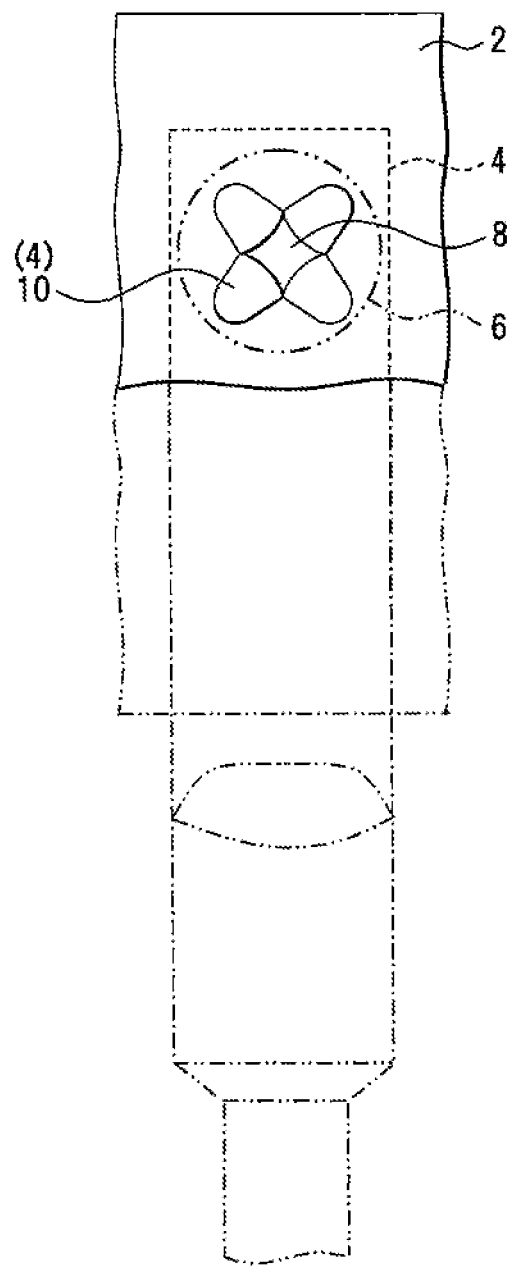
FIG. 1 shows an example of a state of connecting electrode foil and a terminal component according to the first embodiment.

The first embodiment of the present invention will be described with reference to FIG. 1. FIG. 1 shows an example of a state of connecting electrode foil and a terminal component according to the first embodiment. The structure shown in FIG. 1 is an example, and the present invention is not limited to such a structure.

In this capacitor, for example, as shown in FIG. 1, a tab 4 that is a terminal component is layered on a flat face of electrode foil 2, and a stitching part 6 connecting the electrode foil 2 and the tab 4 to each other is formed on part of the layered portion. This electrode foil 2 is, for example, mostly electrode foil on the anode side, and an etch layer 16 of a high enlargement (FIG. 2B) is formed in the surface of the electrode foil. The electrode foil 2 is, for example, formed into a belt that is long sideways. A separator not shown is put between the electrode foil on the anode side and electrode foil on the cathode side to be wound or layered, to form a capacitor element.

At least the surface of part of the electrode foil 2 where the stitching part 6 is formed is treated. This surface-treated electrode foil 2 includes a plurality of interrupting parts 12 (FIGS. 2A to 2C) in the etch layer 16, which is formed in the surface thereof.

The tab 4 that is connected to the electrode foil 2, for example, includes a flat part layered on the flat face of the electrode foil 2, and a lead part. The flat part of the tab 4 is a flat portion of a compression-molded flat aluminum bar. The lead part is, for example, formed of wire that is plated solderable metal, etc.

For example, an opening 8 that passes through the electrode foil 2 and the flat portion of the tab 4 by a stitch needle 30 (FIGS. 3A to 3D) and raised pieces 10 of the tab 4 which passes through the opening 8 to the back face side of the electrode foil 2 to be inserted into the electrode foil 2 are arranged in the stitching part 6. These raised pieces 10 are folded with respect to the flat face of the electrode foil 2, which is the inserted side. This unites the electrode foil 2 and the tab 4.

<Surface Treatment Process on Electrode Foil 2>

Figure 2A:
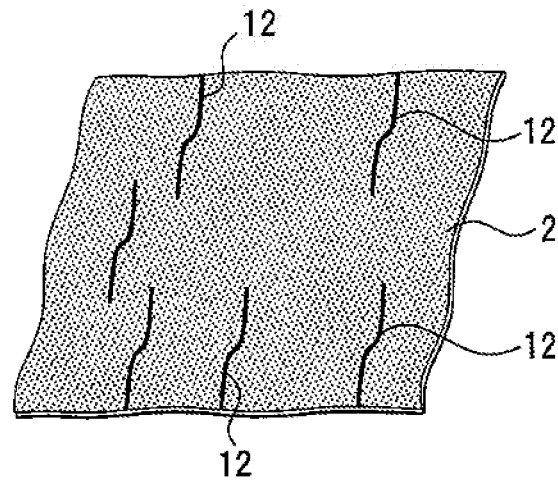
FIGS. 2A to 2C show an example of a surface condition of the electrode foil.
Figure 2B:
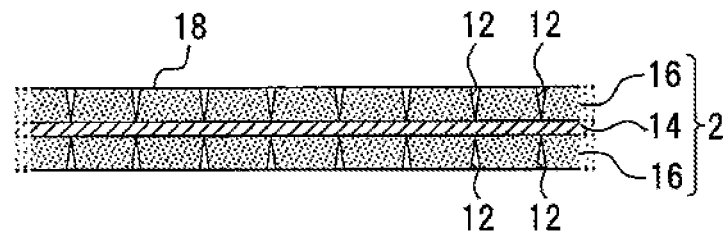
Figure 2C:
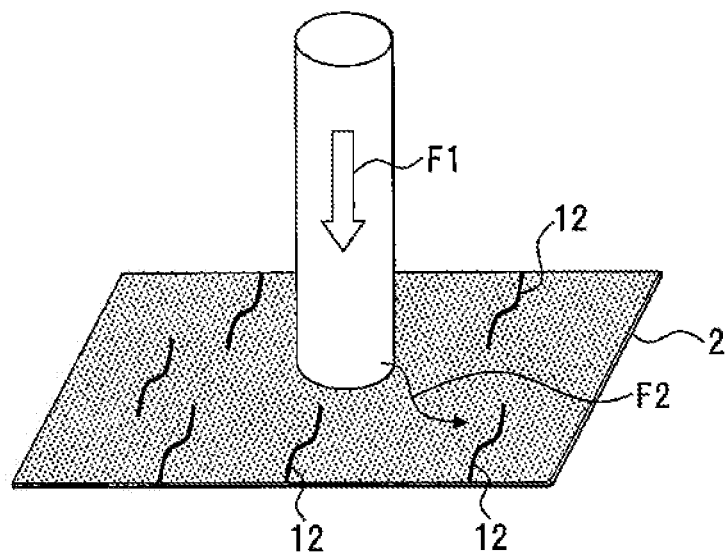

FIGS. 2A to 2C show an example of a surface condition of the electrode foil. The surface condition shown in FIGS. 2A to 2C is an example.

For example, as shown in FIG. 2A, the linear interrupting parts 12 are formed in the electrode foil 2 along the shorter sides of the electrode foil 2. For example, the length of each interrupting part 12 and intervals at which the interrupting parts 12 are formed may be freely set, or the directions of the lines of the interrupting parts 12 may be determined according to the way of forming the interrupting parts 12.

The direction of forming each interrupting part 12 may be along the direction of the longer sides of the electrode foil 2. Each interrupting part 12 may be formed in the direction of the longer sides of or an oblique direction of the electrode foil 2.

As shown in FIG. 2B, a core portion 14 of a predetermined thickness is formed in the middle of the electrode foil 2 in the thickness direction, and each surface-enlarged etch layer 16 is formed on both sides of the core portion 14 of the electrode foil 2. The interrupting parts 12 are formed in each etch layer 16 of the electrode foil 2. A dielectric oxide film 18 is formed over each surface of the etch layers 16 and the interrupting parts 12 in the electrode foil 2. The thickness of the core portion 14 is, for example, 20 to 60 ($\mu$m), and the total thickness of the etch layers 16 on both sides may be within a range of 40 and 200 ($\mu$m).

For example, the interrupting parts 12 are formed by interrupting the etch layer 16 by a predetermined depth from the surface of the electrode foil 2 toward the core portion 14. The depth at which each interrupting part 12 is formed may be such as not to interrupt the core portion 14, and for example, may be to the extent of being the same as the depth of the etch layer 16 with respect to the thickness direction of the electrode foil 2. All the interrupting parts 12 are not necessary to have the same fixed depth. For example, in addition to cracking the etch layer 16 in the thickness direction, a technique of tearing, cutting, notching or carving the surface of the electrode foil with a predetermined jig may be employed to form the interrupting parts 12. For example, a technique of applying a predetermined pressure or tension to the surface-enlarged and chemical-treated electrode foil 2 may be employed to form cracks.

For example, the opening width of each interrupting part 12 may be formed so as to be no more than 0 to 50 ($\mu$m) when the electrode foil 2 is laid flat. The interrupting parts 12 may be formed not only in the etch layers 16 on both sides of the electrode foil, but also just in a face to be deformed or pressed in the winding direction of or in a stitching process on the electrode foil 2. The interrupting parts 12 make the surface of the electrode foil 2 have so-called a pleated shape by forming a plurality of cuts. The position where each interrupting part 12 is formed, the range within which the interrupting parts 12 are formed, the number of forming the interrupting parts 12, and intervals at which the interrupting parts 12 are formed may be, for example, set according to magnitudes of pressing force applied to the electrode foil 2, and/or bending stress due to deformation, etc. The mean interval between adjacent interrupting parts 12 may be, for example, 220 (μm) by the pitch.

The electrode foil 2 in which the interrupting parts 12 are formed as described above deforms without cracking because having flexibility when, for example, a pressing force F1 is applied to the surface of the electrode foil 2 as shown in FIG. 2C. At this time, a force F2 acting on the surface of the electrode foil by the pressing force F1 is, for example, dispersed to a break of the interrupting part 12 that is formed near the pressed position. That is, this interrupting part 12 makes it possible to prevent the acting force F2 from reaching the end face sides through the surface of the electrode foil. This makes it possible for the electrode foil 2 to prevent large cracks from being formed by pressing from the pressed portion toward the end portion of the foil.

<Process of Manufacturing Capacitor>

An example of a process of manufacturing the capacitor will be described. FIGS. 3A to 3D show an example of the stitching process. The process shown in FIGS. 3A to 3D is an example of the method for manufacturing the capacitor of the present disclosure. The procedures, the steps in the process, jigs used for the connection process etc. shown in FIGS. 3A to 3D are examples, and the present invention is not limited to such a structure.

This process of manufacturing the capacitor includes, for example, a process of forming the electrode foil 2 including forming the interrupting parts 12 in the anode foil, and a process of connecting the tab 4 to the electrode foil 2. The process of forming the electrode foil 2 includes, for example, a process of shaping aluminum foil etc., a process of forming the etch layer 16 on the surface on the anode side by a surface-enlarging process, and a process of forming a dielectric oxide film by chemical conversion treatment. An aging process of forming the dielectric oxide film 18 over each surface of the interrupting parts 12 may be carried out after the interrupting parts 12 are formed at predetermined positions in the surface of the electrode foil 2.

Figure 3A:
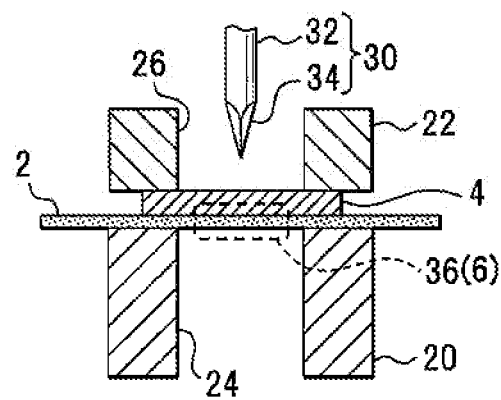
FIGS. 3A to 3D show an example of a stitching process.

In the process of connecting the electrode foil 2 and the tab 4, for example, as shown in FIG. 3A, the tab 4 as a terminal component is layered onto the top face of the electrode foil 2. These electrode foil 2 and tab 4 are disposed on a lower die 20 as an example of a first die, and an upper die 22 as an example of a second die is disposed on the top face of the tab 4. In short, the electrode foil 2 and the tab 4 are sandwiched between the lower die 20 and the upper die 22, to be held.

Holes 24 and 26 are formed in the lower die 20 and the upper die 22 respectively. The stitch needle 30 is arranged at the center of the hole 26 of the upper die 22. For example, this stitch needle 30 includes a columnar shaft portion 32 provided with a pyramidal tip portion 34 of an acute angle.

At this time, the electrode foil 2 is arranged so that, for example, a range 36 within which the interrupting parts 12 are formed aligns with a place the stitch needle 30 is to punch. This range 36 is an example of a range of the stitching part 6, may be set for the center thereof to be set the place the stitch needle 30 is to punch, and may be set so as to include a range within which the raised pieces 10 of the tab 4 are folded.

Figure 3B:
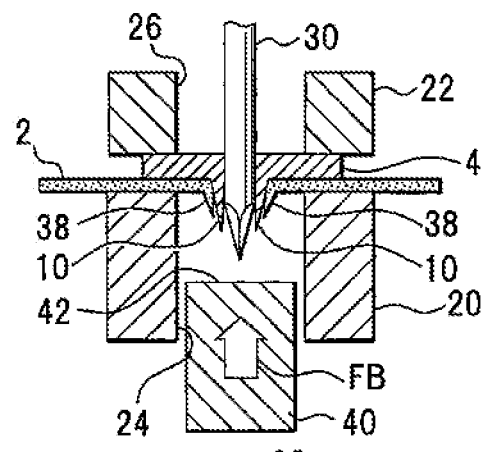
Figure 3C:
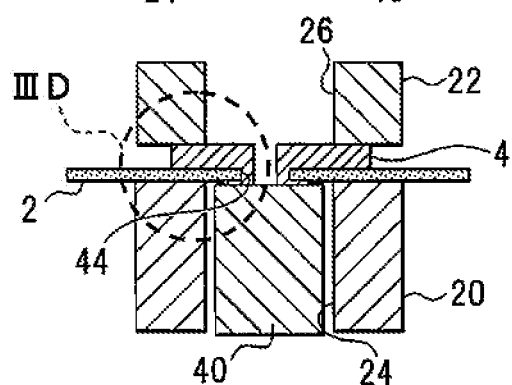

In a step of punching by the stitch needle 30, as shown in FIG. 3B, the electrode foil 2 and the tab 4 are held between the lower die 20 and the upper die 22, and the stitch needle 30 is inserted through these electrode foil 2 and tab 4 from the tab 4 side. This insertion causes the raised pieces 10 to be generated on the tab 4, which is cut by the tip portion 34 of the stitch needle 30, and raised pieces 38 to be generated on the electrode foil 2. At this time, the raised pieces 10 are inserted through the electrode foil 2, along with the stitch needle 30.

After the raised pieces 10 are formed on the back side of the electrode foil 2 with the stitch needle 30, the stitch needle 30 is moved back. After the stitch needle 30 is moved back, a molding die 40 is arranged beneath the electrode foil 2. A pressing face 42 is formed in the molding die 40. This pressing face 42 is put onto the raised pieces 10, and the raised pieces 10 are pressed between the molding die 40 and the upper die 22, to mold the raised pieces 10 of the tab 4 on the back face of the electrode foil 2.

Figure 3D:
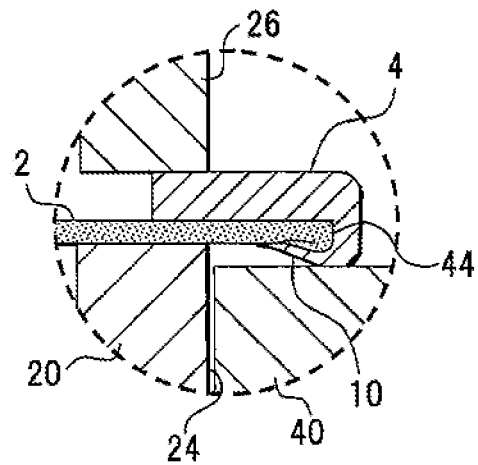

The raised pieces 10 and 38 are, for example, as shown in FIG. 3D, pressed onto the back face of the electrode foil 2, to be connected to the electrode foil 2. Whereby, a folding connection part 44 at which the tab 4 is closely adhered to the electrode foil 2 is formed. Each edge of the pressing face 42 of the molding die 40 has, for example, a curved face, which makes it possible to improve the quality of compression molding without any damages to the raised pieces 10 and 38 of the electrode foil 2 and the tab 4.

After this stitching process, the aging process of further forming the dielectric oxide film 18 may be carried out on each surface of the interrupting parts 12.

In this stitching process, for example, pressure received from the tab 4, which deforms due to punching by the stitch needle 30, and pressure FB received from pressing by the molding die 40 are applied to the electrode foil 2. The interrupting parts 12 of the electrode foil 2 disperse the applied pressure in the range 36 including the stitching part 6, or to a circumferential part of the range 36, to prevent the pressure from being propagated to the end face sides of the electrode foil 2.

Effects of First Embodiment (1) The interrupting parts 12 formed in the surface of the electrode foil 2 makes it possible for the electrode foil of a higher capacitance to have flexibility, makes it possible to suppress cracks caused by pressing, and makes it possible to prevent cracks from spreading.

(2) Forming the interrupting parts 12 leads to improved moldability of the electrode foil 2, which makes it possible to prevent the electrode foil 2 from being damaged in the process of connecting the tab 4 including folding the electrode foil 2, and pressing the raised pieces 10 and 38 of the electrode foil 2 and the tab 4 onto the electrode foil 2.

(3) Improved moldability of the electrode foil 2 makes it possible to further thin the core portion 14 of the electrode foil 2, and to have the capacitor of a higher capacitance.

(4) Suppressing breakages in the electrode foil 2 makes it possible to improve reliability of the electrode foil 2 and the capacitor.

(5) The electrode foil 2 having flexibility makes it possible to achieve improved accuracy in processing the electrode foil 2, and to reduce the probability of manufacturing products of nonconformity.

(6) Force applied in the punching process and the folding process in stitching is easy to be adjusted.

(7) The damage rate of the electrode foil 2 is reduced, which makes it possible to accelerate the processes, and a process of checking products.

(8) The electrode foil 2 is prevented from being damaged by connection of the tab, which makes it possible to omit an aging process or to carry out only a simple aging process after processed, to achieve acceleration of the process of manufacturing the capacitor.

Second Embodiment

Figure 4A:
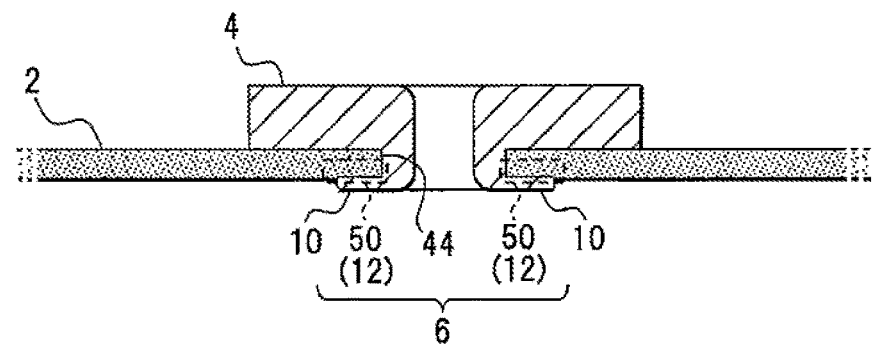
FIGS. 4A and 4B show an example of positions where the interrupting parts are formed with respect to the electrode foil according to the second embodiment.
Figure 4B:
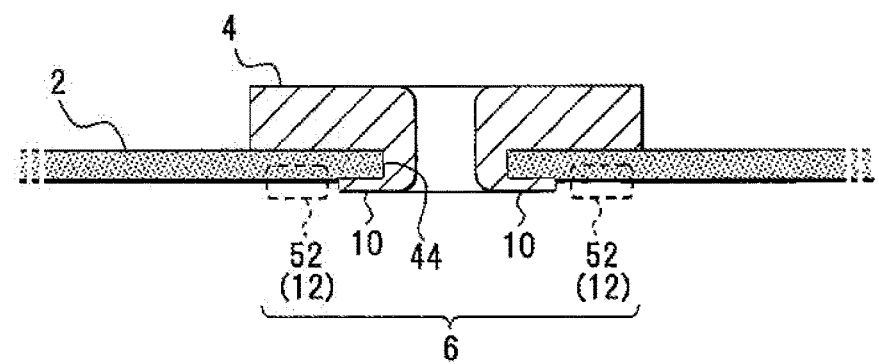

FIGS. 4A and 4B show an example of positions where the interrupting parts of the electrode foil are formed according to the second embodiment.

In this embodiment, the positions where the interrupting parts 12 are formed with respect to the electrode foil 2 will be described.

The interrupting parts 12 disperse the pressure applied to the electrode foil 2 due to punching by the stitch needle 30, and the pressure FB in the process of folding the raised pieces 10 and 38 that form the folding connection part 44. To realize such a pressure dispersion function, for example, the interrupting parts 12 may be formed within a partial range of the stitching part 6 on the electrode foil 2 in addition to the case where the interrupting parts 12 are formed all over the stitching part 6.

For example, as shown in FIG. 4A, the interrupting parts 12 may be formed in the electrode foil 2 within a range 50 where at least the raised pieces 10 of the tab 4 abut when the folding connection part 44 is formed. In this case, for example, the opening width due to punching by the stitch needle 30, and the length of the raised pieces 10 formed with the stitch needle 30 may be assumed to determine the range where the interrupting parts 12 are formed in a stage before the stitching process.

The interrupting parts 12 may be formed in the place in the electrode foil 2 which the stitch needle 30 is to punch, and may be formed as avoiding such a place to be punched.

Forming the interrupting parts 12 in this range 50 of the electrode foil 2 makes the electrode foil 2 release the applied pressure FB at its contact portion with the raised pieces 10 when the molding die 40 is pressed thereonto, not to propagate the pressure FB to the circumference of the electrode foil 2.

For example, as shown in FIG. 4B, the interrupting parts 12 may be formed in a range 52 on the electrode foil 2 where at least the raised pieces 10 of the tab 4 do not abut when the folding connection part 44 is formed. The interrupting parts 12 may be formed in this range 52 so as to, for example, surround a portion that the raised pieces 10 abut.

Forming the interrupting parts 12 in the range 52 of the electrode foil 2 as described above, for example, releases stress the electrode foil 2 is received by the process of punching by the stitch needle 30, and folding of the raised pieces 10, from the electrode foil 2 on the outer edge side in the stitching part 6, not to propagate the stress to the circumference of the electrode foil 2.

Effects of Second Embodiment

According to such a structure, the following effects can be obtained in addition to the effects shown in the above described embodiment.

(1) The range where the interrupting parts 12 are formed can be narrowed, which makes it possible to achieve a reduced load in the processes.

(2) Stress of folding transmitted from the contact portion with the tab 4, and of the stitch needle 30 can be interrupted, which makes it possible to prevent the stress from reaching the end faces of the electrode foil 2.

COMPARATIVE EXAMPLE

Figure 5:
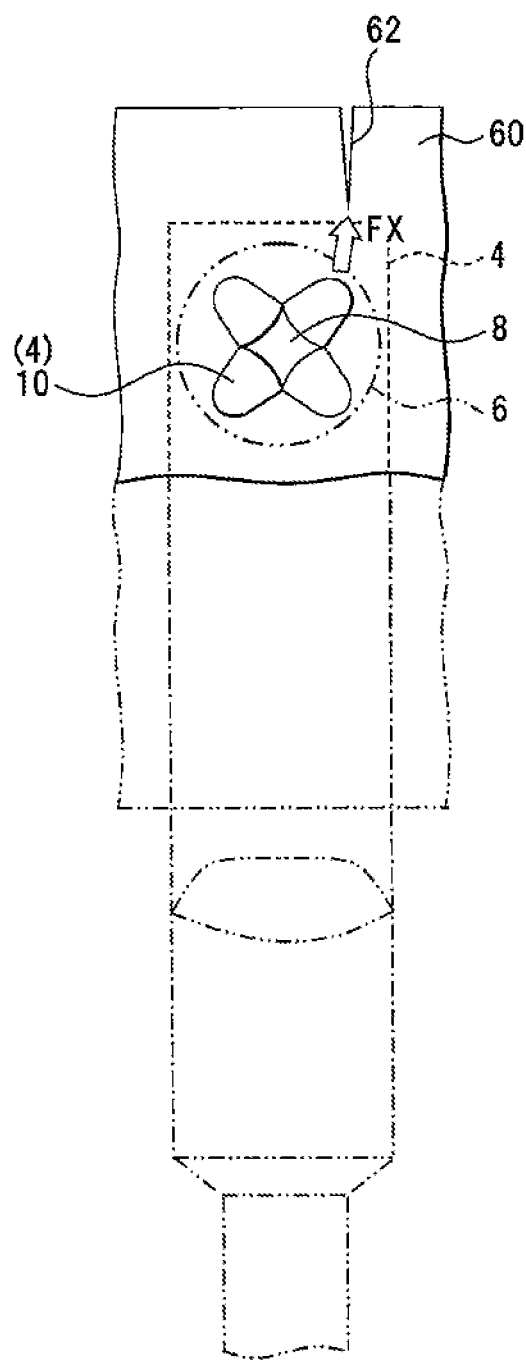
FIG. 5 shows Comparative Example where a crack is formed by stitching.

FIG. 5 shows Comparative Example in a case where the stitching process is performed on electrode foil of a higher capacitance.

Electrode foil 60 of a higher capacitance is surface-enlarged and chemical-treated, which results in further fragility and hardening, and extremely low flexibility that material itself has as described above. Thus, when the tab 4 is arranged on such electrode foil 60 to carry out the stitching process, for example, part or all of stress FX applied by the process of punching by the stitch needle and the process of folding the raised pieces 10 is propagated to the circumference of the stitching part 6 on the electrode foil 60 as shown in FIG. 5. For example, the stress FX is released from an end part side of the electrode foil 60 which is near the stitching part 6. Since a cross-sectional portion of this foil end part is more fragile than the foil face, for example, cracks and interruption are easy to form in the electrode foil 60 toward the stitching part 6, which may cause a large crack 62 to be formed. Such a crack 62 leads to, for example, a reduced capacitance of the capacitor, and an increased ESR (Equivalent Series Resistance), which results in deteriorated characteristics of the capacitor.

In contrast, forming the interrupting parts 12 at least in the stitching part 6 like the present invention releases stress applied by stitching to the outside, and does not make an excess force act on the foil end part side, which makes it possible to suppress cracks to be generated.

Experimental Example 1

Flexibility of the electrode foil 2 according to forming of the interrupting parts 12 will be described. Erichsen value will be shown as an index representing this flexibility of the electrode foil 2. Sheets of the electrode foil 2 whose mean intervals of adjacent interrupting parts 12 were 70 ($\mu$m), 220 ($\mu$m), 950 (um), 2100 (um), and 3100 ($\mu$m) by the pitch respectively were prepared, and electrode foil where no interrupting part was formed was prepared as Comparative Example. An Erichsen test was carried out on each sheet of the electrode foil. In the Erichsen test, each sheet of the electrode foil 2 and the electrode foil, where no interrupting part was formed, were each held between a die of 33 (mm) in inner diameter and a blank holder at 10 (kN), and a chisel-like punch was pushed thereonto. The width of the chisel-like punch was 30 (mm), and its point had a spherical surface of 4 (mm) in diameter in a cross-sectional view. A chisel portion of the punch was pushed onto each sheet of the electrode foil along the shorter sides of the electrode foil. The pushing rate of the punch was 0.5 (mm/min).

Figure 6:
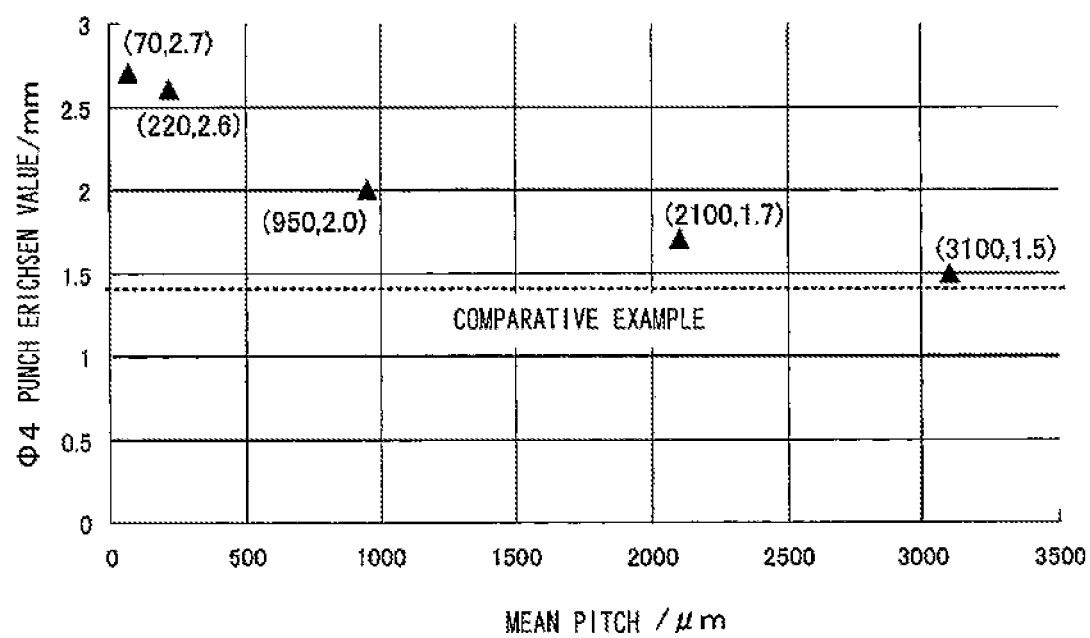
FIG. 6 is a graph showing Experimental Example indicating flexibility of electrode foil according to forming of the interrupting parts.

The results of this Erichsen test are shown in FIG. 6. FIG. 6 is a graph where the horizontal axis shows the mean pitch between adjacent interrupting parts 12, and the vertical axis shows Erichsen value. As shown in FIG. 6, on one hand the Erichsen value of Comparative Example was 1.4 (mm), and on the other hand the Erichsen value of the electrode foil 2 whose mean pitch between adjacent interrupting parts 12 was set in 3100 ($\mu$m) was 1.5 (mm). That is, it is found that providing the interrupting parts 12 allows bending stress in winding to disperse, to give the electrode foil 2 flexibility.

When the mean pitch between adjacent interrupting parts 12 was no more than 2100 ($\mu$m), the Erichsen value was no less than 1.7 (mm), which was apparently different from Comparative Example where the interrupting parts 12 were not formed. That is, it is found that providing the interrupting parts 12 having the mean pitch of no more than 2100

(μm) allows bending stress in winding to well disperse, to give the electrode foil 2 good flexibility.

Specifically, when the mean pitch between adjacent interrupting parts 12 was no more than 950 (μm), the Erichsen Value was no less than 2.0 (mm), which was a dramatically excellent result compared to Comparative Example where no interrupting parts 12 were formed. That is, it is found that providing the interrupting parts 12 having the mean pitch of no more than 950 (μm) allows bending stress in winding to extremely well disperse, to give the electrode foil 2 extremely good flexibility.

Experimental Example 2

Experimental Example in a case where the tab was stitched to the electrode foil, where the interrupting parts were formed, will be shown.

In this Experimental Example, stitching was carried out on ten sheets of electrode foil where the interrupting parts 12 were formed in all over the surface, and ten sheets of electrode foil where no interrupting part was formed. A condition of cracks generated between the stitching part and the end face sides of each sheet of the electrode foil was confirmed.

Each sheet of the electrode foil used here was the same except whether or not to include the interrupting parts.

The results of Experimental Example are shown in the following Table 1.

TABLE 1

Result of Experiment

| | Interrupting parts included | No interrupting parts included |
| --- | --- | --- |
| No cracks | 7 | 1 |
| Cracks generated but not reaching stitching part | 3 | 5 |
| Cracks reaching stitching part | 0 | 4 |

As a result of this Experiment, forming the interrupting parts 12 in the electrode foil leads to the increased number of the sheets of the electrode foil where no cracks were generated by stitching from 1 to 7, which was a great increase. The condition where a few cracks were generated but did not reach the stitching part 6 was less frequent. Further, forming the interrupting parts 12 in the electrode foil 2 did not lead to generation of cracks reaching the stitching part 6. That is, forming the interrupting parts 12 reduced the number of the sheets of the electrode foil where cracks were generated by the stitching process from 9 to 3.

Any sheet of the electrode foil where no cracks were generated, or where cracks were generated but did not reach the stitching part 6 may be employed as the electrode foil 2 where the tab 4 is disposed. Cracks not reaching the stitching part 6 does not affect the strength of the connectivity of the tab 4. Any sheet of the electrode foil where cracks reached the stitching part 6 however affects the connectivity, and thus may not be employed.

From the above mentioned results, using the electrode foil 2 where the interrupting parts 12 are formed makes it possible to greatly reduce the influence of stitching on the electrode foil 2. In addition, forming the interrupting parts 12 makes it possible for the electrode foil 2 after stitching to be unnecessarily restored, or to be restored less than before, and makes it possible to reduce the number of the sheets of the electrode foil 2 that cannot be used because of cracks.

Other Embodiments

Variations of the above described Embodiments will be listed below.

(1) The above described Embodiments show the case where a plurality of the interrupting parts 12 are formed at least in the portion of the electrode foil 2 where the stitching part 6 is formed. The Embodiments are not limited to this. The interrupting parts 12 may be included in an end part of the electrode foil 2 at least in the vicinity of the portion where the tab 4 is connected. This allows stress from the stitching part 6 toward an end side of the electrode foil 2 to disperse, which makes it possible to suppress cracks between the stitching part 6 and the end of the electrode foil. Specifically, the distance between the stitching part 6 and the end of the electrode foil shortens following a reduced size of the capacitor, which leads to more difficult dispersion of stress. Forming the interrupting parts 12 gives the formed portions flexibility, which helps dispersion of stress, and makes it possible to suppress cracks. The interrupting parts 12 may be formed all over the surface of the electrode foil. Giving flexibility not only to the vicinity of the stitching part 6 but also to all over the electrode foil makes it easy for stress occurring in connection to disperse, and makes it expectable to suppress more cracks.

(2) In the above described Embodiments, the shape of each interrupting part 12 formed in the surface of the electrode foil 2 may be any including a straight line, and a line partly having a bending portion. For example, each of the interrupting parts 12 may have a shape of a curved line, or a shape of crossing lines.

(3) The above described Embodiments show the case where the interrupting parts 12 are formed in both of the front and back faces of the electrode foil 2. The Embodiments are not limited to this. For example, the electrode foil 2 may include the interrupting parts 12 in only one of the front and back faces thereof.

(4) The above described Embodiments show the case where the interrupting parts 12 are formed in both of the front and back faces of the electrode foil 2 so that the formed interrupting parts 12 face each other across the core portion 14 of the electrode foil 2. The Embodiments are not limited to this. For example, the interrupting part 12 may be formed at different positions between the front and back faces.

(5) The above described Embodiments show the case where, in the stitching process, the electrode foil 2 is opened together with the tab 4 by punching by the stitch needle 30. The Embodiments are not limited to this. For example, a through hole may be opened in the electrode foil 2 at a position corresponding to where predetermined interrupting parts 12 are formed, before the electrode foil 2 is connected to the tab 4. In the stitching process, the tab 4 may be arranged and the stitch needle 30 may be punched correspondingly to such a position of the through hole. This makes it possible to prevent pressure due to deformation of the tab 4 to be applied in punching by the stitch needle 30. The interrupting parts 12 of the electrode foil 2 have only to deal with pressing from the raised pieces 10 of the tab 4. For example, the interrupting parts 12 can be formed in only one face of the electrode foil 2. Forming the through hole in the electrode foil 2 in advance makes it possible to suppress partial deformation, so-called "unevenness", of the foil due to insertion of the stitch needle 30 as well.

(6) For example, a plurality of the interrupting parts 12 may be radiately formed with respect to the place the stitch needle 30 is to punch. Forming the interrupting parts 12 like this makes it possible to absorb compression stress in pressurizing by the punching process, and to prevent the electrode foil 2 from cracking.

(7) The above described Embodiments describe connection of the tab 4 and the electrode foil 2 using stitching. Connection by cold welding or connection by ultrasonic welding may be employed. In cold welding and ultrasonic welding, the tab placed on the electrode foil is pressed in the direction of the tab. Forming the interrupting parts 12 allows stress in pressing to disperse, which makes it possible to prevent the electrode foil from cracking.

(8) The above described Embodiments show connection of the tab and the electrode foil as an example. This connection may be employed for connection between a tab and electrode foil in various capacitors such as an electrolytic capacitor, and an electric double layer capacitor.

(9) The above described Embodiments show the case where the process of punching by the stitch needle 30, and the process of folding the raised pieces 10 are carried out in series, wherein the lower die 20 and the upper die 22 supporting the electrode foil 2 and the tab 4 are used. The Embodiments are not limited to this. The dies may be changed, and different dies may be used between the punching process and the folding process. A process of releasing the electrode foil 2 and the tab 4 from the dies may be inserted between such processes. According to such a structure, wrinkles and unevenness generated on the electrode foil 2 due to pressing can be dissolved, and breakages in the electrode foil 2 can be prevented.

(10) The above described Embodiments describe connection of the tab 4 and the electrode foil 2. The method for manufacturing the capacitor, needless to say, includes other steps such as a step of winding the electrode foil, and a step of sealing-up in an outer packaging case.

The most preferred embodiment of the present invention etc. have been described above. The present invention is however not limited to this description, and of course various modifications and alternations can be made by the person skilled in the art based on the summary recited in Claims or disclosed in the present description, and needless to say such modifications and alternations are within the scope of the present invention.

INDUSTRIAL APPLICABILITY

According to the capacitor of the present invention, and the method for manufacturing the same, stress applied to the electrode foil in the process of connecting the tab to the electrode foil is released to the outside by the interrupting parts formed in the electrode foil, which makes it possible to prevent the electrode foil hardened and being more fragile due to its higher capacitance from being damaged, which is useful.

REFERENCE SIGNS LIST 2, 60 electrode foil
4 tab
6 stitching part
8 opening
10, 38 raised pieces
12 interrupting parts
14 core portion
16 etch layer
18 dielectric oxide film
20 lower die
22 upper die
24, 26 hole
30 stitch needle
32 shaft portion
34 tip portion
36 range
40 molding die
42 pressing face
44 folding connection part
50, 52 range
62 crack

The invention claimed is:

1. A capacitor comprising:
    electrode foil, an etch layer being formed in the electrode foil, and
    a terminal connected to the electrode foil by stitching, wherein
    the electrode foil includes a plurality of interrupting parts in the etch layer, the plurality of interrupting parts being linear and being formed along a shorter side of the electrode foil, at least a part of each interrupting part being placed in a stitching part at which the terminal is connected, the stitching part being defined as an inside of a circle passing through tips of raised pieces of the terminal, the raised pieces abutting on a back face of the electrode foil.

2. The capacitor according to claim 1, wherein
    a foil core portion is formed in the electrode foil, and
    the electrode foil comprises the plurality of interrupting parts except for the foil core portion.

3. The capacitor according to claim 1, wherein
    the electrode foil comprises the plurality of interrupting parts on an end part of the electrode foil in a vicinity of the stitching part at which the terminal is connected.

4. The capacitor according to claim 1, wherein
    the electrode foil comprises the plurality of interrupting parts in either one or both of face s in the stitching part, one of the faces abutting on a part of the terminal, the part passing through the electrode foil, the other of the faces not abutting on the part of the terminal.

5. The capacitor according to claim 1, wherein
    each of the plurality of interrupting parts has a shape of a straight line of a predetermined length, a curved line of a predetermined length, or a crossing lines, or any combination thereof.

6. The capacitor according to claim 1, wherein the electrode foil comprises the plurality of interrupting parts in either one or both faces thereof.

7. The capacitor according to claim 6, wherein
    a foil core portion is formed in the electrode foil, and
    the plurality of interrupting parts in both faces of the electrode foil are arranged either at positions where the plurality of interrupting parts face each other across the foil core portion, or at positions where the plurality of interrupting parts do not face each other across the foil core portion.

8. The capacitor according to claim 1, wherein
    the electrode foil includes an opening in the stitching part,
    the terminal includes an opening and the raised pieces in the stitching part,
    the raised pieces pass through the opening of the electrode foil, and
    the etch layer includes the plurality of interrupting parts within a range where the raised pieces abut.

9. The capacitor according to claim 1, wherein
the plurality of interrupting parts has an opening width of not less than 0 µm and not more than 50 µm when the electrode foil is laid flat, and
surfaces of each interrupting part at least partially come into contact with each other when the opening width is 0 µm and the electrode foil is laid flat.

10. A method for manufacturing a capacitor having electrode foil and a terminal connected to the electrode foil by stitching, the method comprising:
forming a plurality of interrupting parts in an etch layer formed in the electrode foil, the plurality of interrupting parts being linear and being formed along a shorter side of the electrode foil, at least a part of each interrupting part being placed in a stitching part at which the terminal is to be connected; and
arranging the terminal at the stitching part, to connect the terminal by the stitching, wherein
the stitching part is defined as an inside of a circle passing through tips of raised pieces of the terminal, and the raised pieces abut on a back face of the electrode foil.

11. The capacitor according to claim 1, wherein
the plurality of interrupting parts is arranged so that mean pitch between adjacent interrupting parts is not more than 2100 µm.

12. The method for manufacturing the capacitor according to claim 10, wherein
the plurality of interrupting parts has an opening width of not less than 0 µm and not more than 50 µm when the electrode foil is laid flat, and
surfaces of each interrupting part at least partially come into contact with each other when the opening width is 0 µm and the electrode foil is laid flat.

13. The method for manufacturing the capacitor according to claim 10, wherein plurality of interrupting parts is arranged so that mean pitch between adjacent interrupting parts is not more than 2100 µm.

\* \* \* \* \*